Figure 1:
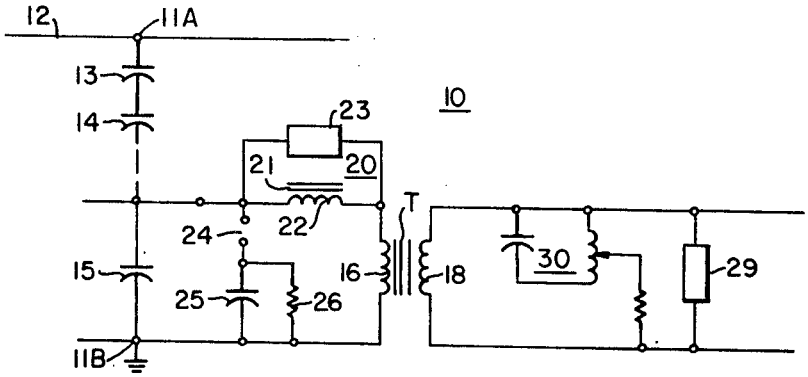
Figure 2:
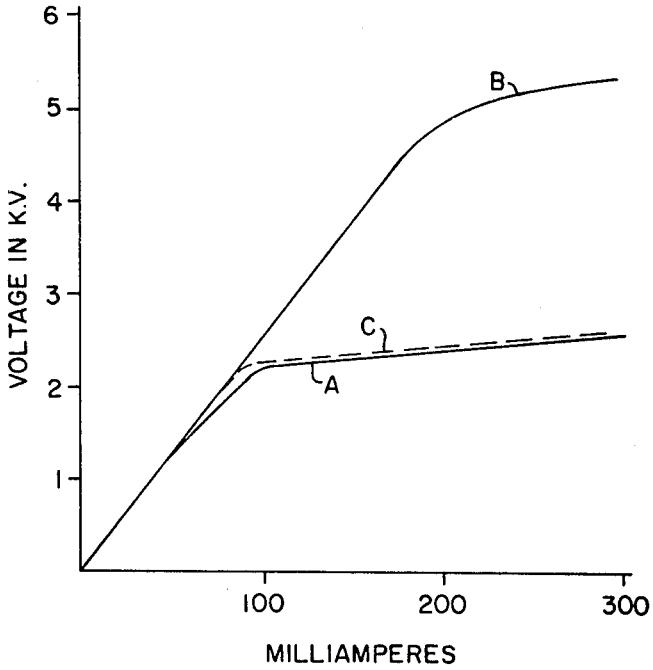
Figure 3:
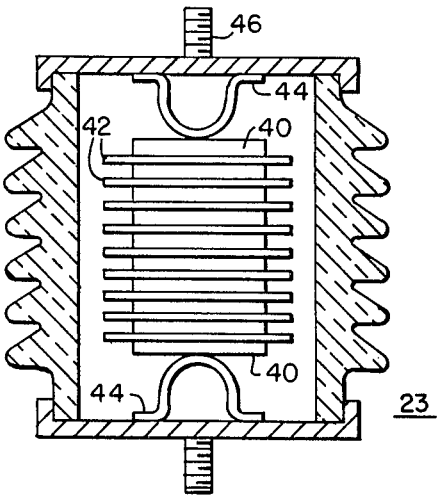

United States Defensive Publication [19] (H) [11] T966,010

Sweetana, Jr. et al. [43] Jan. 3, 1978

[54] CAPACITIVE VOLTAGE TRANSFORMER WITH IMPROVED COMPENSATING REACTOR ARRANGEMENT

[75] Inventors: Andrew S. Sweetana, Jr.; Gerald B. Boyette, both of Bloomington; Frederick J. Brown, Ellettsville, all of Ind.

[73] Assignee: Westinghouse Electric Corporation, Pittsburgh, Pa.

[21] Appl. No.: 785,381

[22] Filed: Apr. 7, 1977

Related U.S. Application Data

[63] Continuation of Ser. No. 631,296, Nov. 12, 1975, abandoned.

[51] Int. Cl.[2] ..... G05F 3/06

[52] U.S. Cl. ..... 323/61; 361/38

[57] ABSTRACT

A compensating reactor in a coupling capacitor potential device including a magnetic core with an inductive winding, the reactor providing inductive reactance cancelling capacitive reactance of the device, and a voltage limiting device connected across the compensating reactor which is a ceramic oxide non linear resistor. The reactor core can be a magnetic steel whose normal saturation level substantially exceeds the voltage at which the voltage limiter changes resistance.

5 Claims, 1 Sheet Drawing,

12 Pages Specification

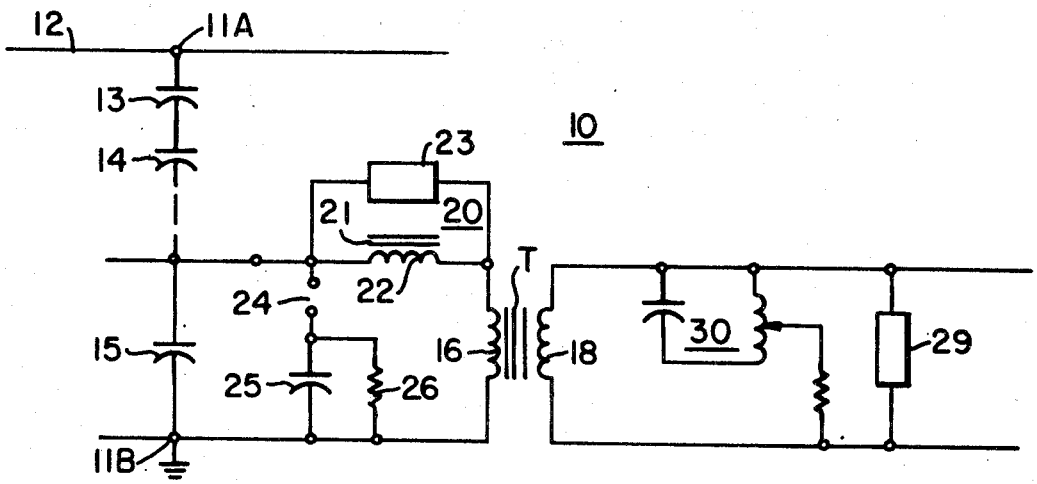

The file of this unexamined application may be inspected and copies thereof may be purchased (849 O.G. 1221, Apr. 9, 1968).